United States Patent
Kosik et al.

(10) Patent No.: US 6,588,860 B2
(45) Date of Patent: *Jul. 8, 2003

(54) TEMPERATURE COMPENSATED LIFT-THROTTLE REGENERATIVE BRAKING

(75) Inventors: Richard C. Kosik, Plymouth, MI (US); Steven Otis Pate, Royal Oak, MI (US); William F. Sanderson, Jr., Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/851,676

(22) Filed: May 9, 2001

(65) Prior Publication Data

US 2002/0167221 A1 Nov. 14, 2002

(51) Int. Cl.[7] .................................................. B60T 8/04
(52) U.S. Cl. ........................ 303/152; 303/191; 701/71
(58) Field of Search ............................... 701/70, 71, 73, 701/80; 180/165; 318/362, 326; 303/151, 152, 191

(56) References Cited

U.S. PATENT DOCUMENTS

| | | | | |
|---|---|---|---|---|
| 3,802,528 A | * | 4/1974 | Leiber ........................ 180/197 |
| 5,235,950 A | * | 8/1993 | Schmitt et al. ............. 180/197 |
| 5,343,970 A | * | 9/1994 | Severinsky .................. 180/165 |
| 5,615,933 A | * | 4/1997 | Kidston et al. ............. 303/152 |
| 5,895,100 A | * | 4/1999 | Ito et al. ..................... 303/152 |
| 5,915,801 A | * | 6/1999 | Taga et al. .................. 303/152 |
| 5,921,889 A | * | 7/1999 | Nozaki et al. .............. 477/158 |
| 5,928,302 A | * | 7/1999 | Fukada ....................... 180/197 |
| 6,059,688 A | * | 5/2000 | Nozaki et al. .............. 180/197 |
| 6,102,146 A | * | 8/2000 | Schmidt et al. ............. 180/197 |
| 6,161,641 A | * | 12/2000 | Fukumura et al. .......... 180/197 |
| 6,185,495 B1 | * | 2/2001 | Bauerle ....................... 701/70 |
| 6,275,763 B1 | * | 8/2001 | Lotito et al. ................ 303/152 |

* cited by examiner

Primary Examiner—Douglas C. Butler
Assistant Examiner—Robert A Siconolfi
(74) Attorney, Agent, or Firm—R. J. Hill & Assoc; Carlos L. Hanze

(57) ABSTRACT

The amount of regenerative braking that is applied to the wheels (105) of a vehicle (100) is based on ambient temperature and a lift-throttle event. An ambient temperature sensor (108) monitors the temperature around the vehicle. Based on the temperature, a map is selected (204, 212, 214). If a lift-throttle event occurs, then the map is applied (206, 208). Compression regenerative braking is reduced to zero if an anti-lock braking system event occurs or if the throttle is re-applied, or both (216, 218, 220, 222).

20 Claims, 3 Drawing Sheets

TEMPERATURE COMPENSATED LIFT-THROTTLE REGENERATIVE BRAKING

FIELD OF THE INVENTION

The present invention relates generally to regenerative braking, and in particular, to the reduction in the amount of regenerative braking force applied to the wheels of a vehicle based on ambient temperature and a lift-throttle event.

BACKGROUND OF THE INVENTION

An electric or hybrid vehicle can produce electricity and braking torque by using its traction motor as a generator during braking. This is called regenerative braking. Compression regenerative braking is applied when a driver deactivates the accelerator pedal, creating a lift-throttle event. Service brake regenerative braking is applied when the driver activates the brake pedal. Typically, total regenerative braking is determined by summing a compression regenerative braking component with a service brake regenerative component.

In vehicles employing regenerative braking and an anti-lock braking system, the regenerative braking system must work with the anti-lock braking system during an anti-lock brake event. Typically, regenerative braking is rapidly terminated in a controlled manner during an anti-lock braking event to permit the anti-lock braking system to completely control braking.

It is known to use the ambient temperature to selectively determine the amount of service brake regeneration to apply. In particular, less service brake regeneration is applied in cold temperatures to prevent slip due to a surface with a low coefficient of friction, for example, a surface with snow or ice. At higher temperatures more service brake regenerative braking is applied due to less likelihood of slip due to ice or snow.

It is also known to selectively change the rate of reduction of regenerative braking (compression and service brake regeneration) during an anti-lock braking event based on the ambient temperature. More specifically, the rate of reduction or slew-out rate of regenerative braking is increased at lower temperatures and decreased at higher temperatures. This helps maintain vehicle stability where the anti-lock brake system interprets a bump or other loss of contact with a road surface as a slip or anti-lock event.

However, selectively reducing service brake regenerative braking alone as a function of ambient temperature is not sufficient for some vehicles and conditions. In particular, a lift-throttle event that induces regenerative braking may cause slipping. This may undesirably lead to vehicle instability, especially in rear-wheel drive electric and hybrid electric vehicles.

Therefore, a need exists for a method to gradually reduce the amount of compression regenerative braking force selectively at cold temperatures where snow or ice may form on road surfaces.

SUMMARY OF THE INVENTION

The present invention provides a method to reduce the amount of regenerative braking force applied to the wheels of a vehicle when temperatures get cold enough for snow and ice to form. Preferably, an ambient temperature sensor coupled to the vehicle monitors the temperature around the vehicle. Based on the ambient temperature, a determination is made as to the amount of regenerative braking that will be applied to the wheels of the vehicle if compression regenerative braking is needed. If a lift-throttle event is detected, the selected amount of regenerative braking is applied. The amount of regenerative braking is preferably determined by selecting an amount of electrical current that is supplied from an electric motor that controls the braking force on the wheels. For temperatures above a first threshold, the applied regenerative braking force is higher than for temperatures below the first threshold. Hence at lower temperatures, less regenerative braking force is applied, which reduces the likelihood of vehicle slippage due to a road surface with a low coefficient of friction.

The selected regenerative braking force preferably varies as a function of the vehicle's speed. This function is referred to as a map. To determine the amount of regenerative braking to be applied to the wheels of the vehicle, a map is selected based on the ambient temperature. For example, if the temperature is greater than or equal to a first threshold, a standard compression brake regen (CBR) map is selected; or, if a temperature is less than a second threshold, then a cold weather CBR map is selected. If the temperature is less than a first threshold but greater than a second threshold, then there is a linear interpolation between the standard and cold-weather CBR maps. The selected CBR map preferably determines a current that is controlled (as a function of vehicle speed) by the electric motor that is driven by the wheels.

If there is an anti-lock braking system (ABS) event, that is, a slip or lock is detected, then there is a slew out of the compression regenerative braking force to zero. In other words, the compression regenerative braking force is rapidly reduced to zero to permit the anti-lock braking system to control further braking. Reapplication of the throttle ends the application of compression regenerative braking.

A vehicle in accordance with the invention includes a temperature sensor to determine the ambient temperature, an accelerator position sensor that detects the beginning and end of lift-throttle events, and a processor that implements a stored program to perform the method described above.

DETAILED DESCRIPTION OF THE PREFERRED EMBODIMENTS

Figure 1:
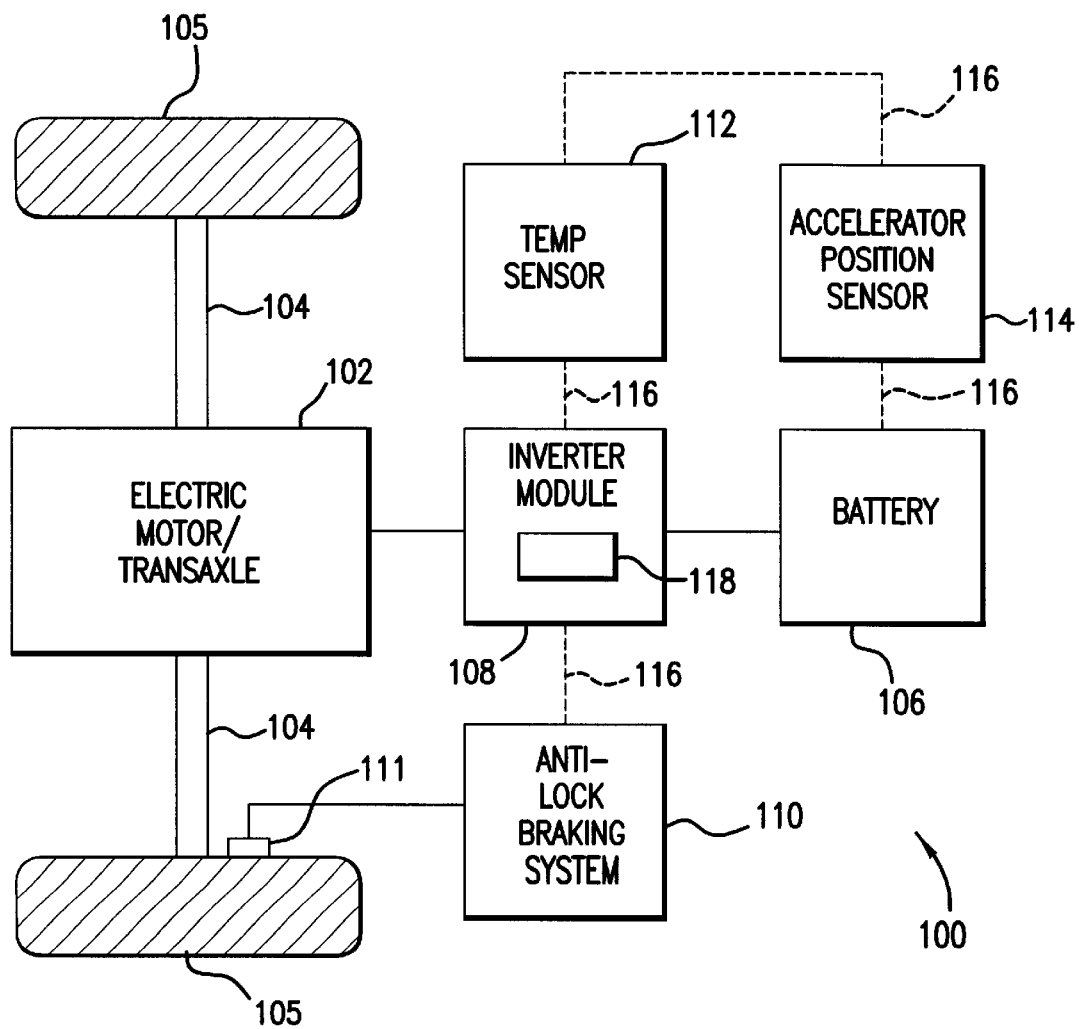
FIG. 1 is a block diagram of a preferred embodiment of a vehicle in accordance with the present invention.

FIG. 1 is a block diagram of a vehicle 100 with temperature compensated compression regenerative braking in accordance with the present invention. Vehicle 100 includes an electric motor/transaxle 102. Electric motor/transaxle 102 includes an electric motor mechanically coupled to a gearbox. Electric motor/transaxle 102 drives a drive axle 104 to rotate and brake wheels 105. A battery 106 serves as the power source for electric motor/transaxle 102. Battery 106 provides a D.C. current to an inverter module 108. Inverter module 108 converts the D.C. current to A.C. currents for operation of electric motor/transaxle 102.

Vehicle 100 includes an anti-lock brake (ABS) system 110. ABS system 110 senses slips and locks of wheels 105.

The slips and locks constitute anti-lock braking events. The anti-lock braking system 110 controls a friction brake 111 that is mechanically coupled to brake wheels 105. ABS system 110 also controls termination of regenerative braking.

Vehicle 100 also includes a plurality of sensors that sense various operating parameters of vehicle 100. Shown in FIG. 1 is an ambient temperature sensor 112 and an accelerator position sensor 114. Ambient temperature sensor 112 detects an ambient temperature around vehicle 100. Accelerator position sensor 114 detects when an accelerator pedal or throttle is applied or deactivated. That is, accelerator position sensor 114 determines lift-throttle events and when a throttle is applied. Temperature sensor 112, accelerator position sensor 114, battery 106, inverter module 108, an anti-lock braking system 110 are all coupled together for communication via a vehicle communication system 116.

In accordance with the present invention, inverter module 108 determines a current to electric motor/transaxle 102, which in turn determines a regenerative braking force on wheels 105. More specifically, inverter module 108 includes a processor 118 that uses the ambient temperature in conjunction with a lift-throttle event to determine an amount of regenerative braking force on wheels 105. This compression regenerative braking force is selectively adjusted such that in temperatures where slips are likely to occur, regenerative braking is reduced to levels that promote vehicle stability on low mu ($\mu$) surfaces.

Figure 2:
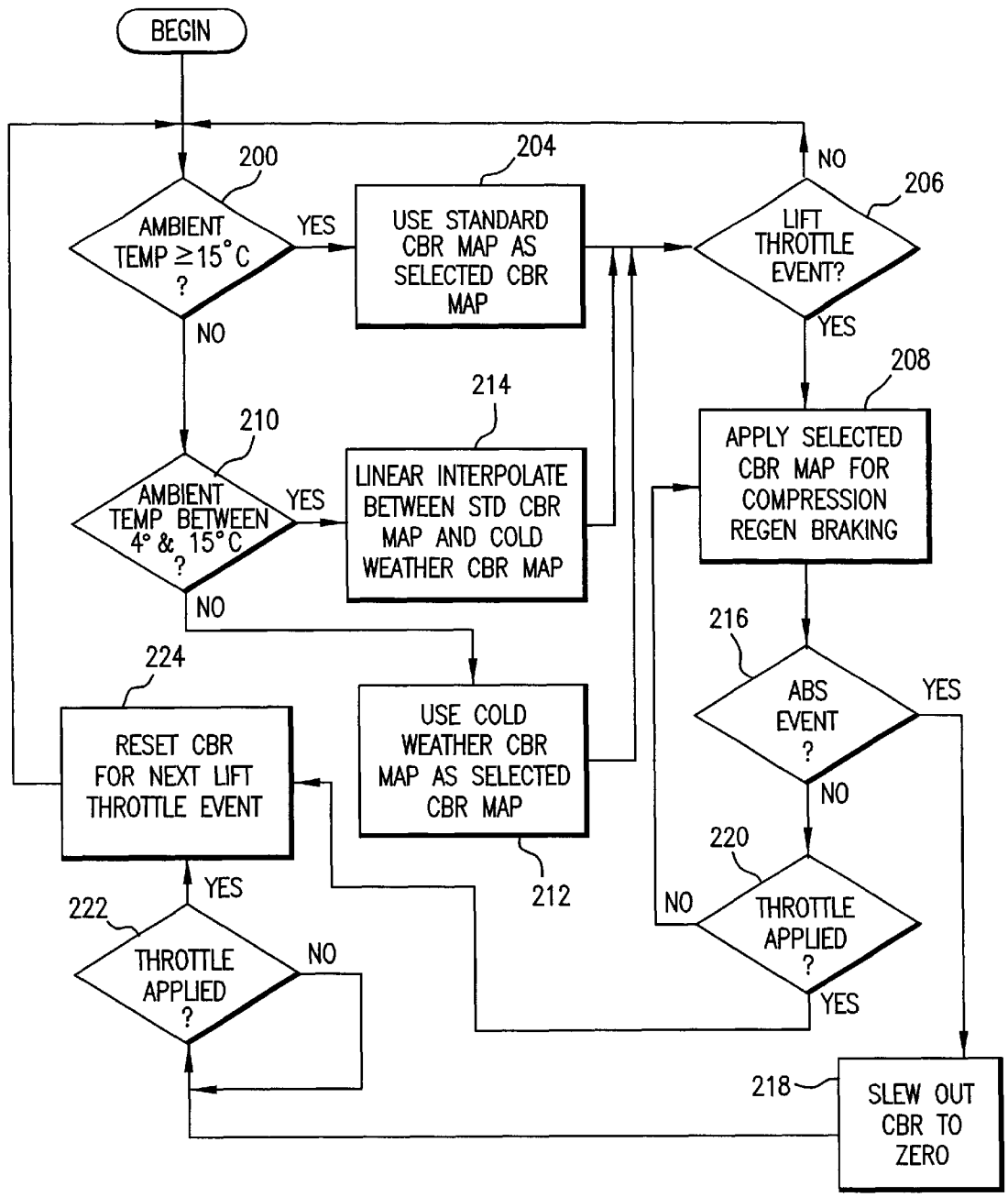
FIG. 2 is a flow chart illustrating a method to reduce regenerative braking force applied to the wheels of a vehicle in accordance with the present invention.

FIG. 2 is a flow chart illustrating an operation of vehicle 100 and a method for controlling compression brake regenerative force in accordance with the present invention. First, a determination is made as to whether the ambient temperature is greater than or equal to 15 degrees Celsius, which is approximately 60 degrees Fahrenheit (200). Preferably, temperature sensor 112 continuously detects the ambient temperature and provides this reading to processor 118 via vehicle communication system 116. Fifteen degrees Celsius is a preferred high temperature threshold, but another temperature may be alternatively selected.

If the ambient temperature is greater than or equal to 15 degrees Celsius (200), then a standard compression brake regen (CBR) map or function is chosen as the selected CBR map. The standard CBR map is a function that determines an amount of regenerative braking force to be applied as a function of the vehicle's speed in response to a lift-throttle event. A preferred standard CBR map is discussed below with respect to FIG. 3. In general, the standard CBR map is determined experimentally for a particular vehicle based on a number of factors including the weight, weight distribution, front-wheel vs. rear-wheel drive, tire size and construction, tire traction, and other parameters. The standard CBR map typically maximizes the amount of regenerative braking force, which maximizes the amount of charging current provided to a battery. However, because the standard CBR map maximizes the amount of regenerative braking force, the standard CBR map may cause vehicle wheel slip when the vehicle is on a surface with a low coefficient of friction.

If the ambient temperature is not greater than or equal to 15 degrees Celsius (200), then a determination is made as to whether the ambient temperature is between 4 degrees and 15 degrees Celsius (210). That is, a determination is made as to whether the ambient temperature is between a high temperature threshold, 15 degrees Celsius and a preferred low temperature threshold, 4 degrees Celsius. The low temperature threshold may vary, but 4 degrees Celsius, which is approximately equal to 40 degrees Fahrenheit, is preferred.

If the ambient temperature is not between 4 degrees and 15 degrees Celsius (210), then the temperature is below or equal to the low temperature threshold, 4 degrees Celsius. In this case, a cold weather CBR map is chosen as the selected CBR map (212). The cold weather CBR map is a function that determines an amount of regenerative braking force to be applied as a function of the vehicle speed. A preferred cold weather CBR map is discussed below with respect to FIG. 3. In general, the cold weather CBR map is determined experimentally for a particular vehicle based on a number of vehicle factors similar to those used in determining the standard CBR map. The cold weather CBR map sacrifices the amount of regenerative braking force to minimize the possibility of slip due to snow or ice forming on a road surface. This sacrifices the amount of current available due to regenerative braking to recharge a battery.

If the ambient temperature is between 4 degrees and 15 degrees Celsius (210), then the amount of regenerative braking force to be applied is determined by interpolating between the standard CBR map and the cold weather CBR map (214). In other words, the selected CBR map is a function of the standard CBR map and the cold weather CBR map. This creates, in effect, another CBR map that determines the regenerative braking force as a function of the vehicle speed.

After an appropriate CBR map is chosen to be the selected CBR map (204, 212, 214), a determination is made as to whether there is a lift-throttle event (206). Preferably, accelerator position sensor 114 detects lift-throttle events and provides an indication of a lift-throttle event to processor 118 via vehicle communication system 116. If no lift-throttle event is detected, then no action need be taken until another periodic check by processor 118. If on the other hand, a lift-throttle event is detected (206), then the selected CBR map is used to apply compression regenerative braking (208). That is, the standard CBR map, cold weather CBR map or an interpolation between the two, is applied to determine the compression regenerative braking. Which CBR map is used as the selected CBR map is determined based on the ambient temperature, as discussed above with respect to steps 204, 212, 214.

Application of the selected CBR map (208) preferably entails determining a current that is supplied by electric motor/transaxle 102. The current then determines the amount of regenerative braking force that is applied to wheels 105. Preferably, processor 118 produces a command that is used by inverter module 108 to determine a current (negative is used to describe regenerative current) that is supplied by electric motor/transaxle 102.

During application of the CBR map to provide compression regenerative braking, processor 118 preferably monitors anti-lock brake system events, as determined by ABS system 110 (216). If an ABS event, for example, a slip, occurs then the compression brake regeneration is reduced to zero rapidly in a controlled manner (218). If no ABS event is detected (216), and the throttle is not re-applied (220), then compression regenerative braking is continuously applied based on the selected CBR map. If the throttle is applied before or after an ABS event (220, 222), then the compression brake regeneration is reset until the next lift-throttle event (224). Otherwise, the state of the compression brake regeneration is preserved. After reset (224), the flow is free to begin again with a check of the ambient temperature.

Figure 3:
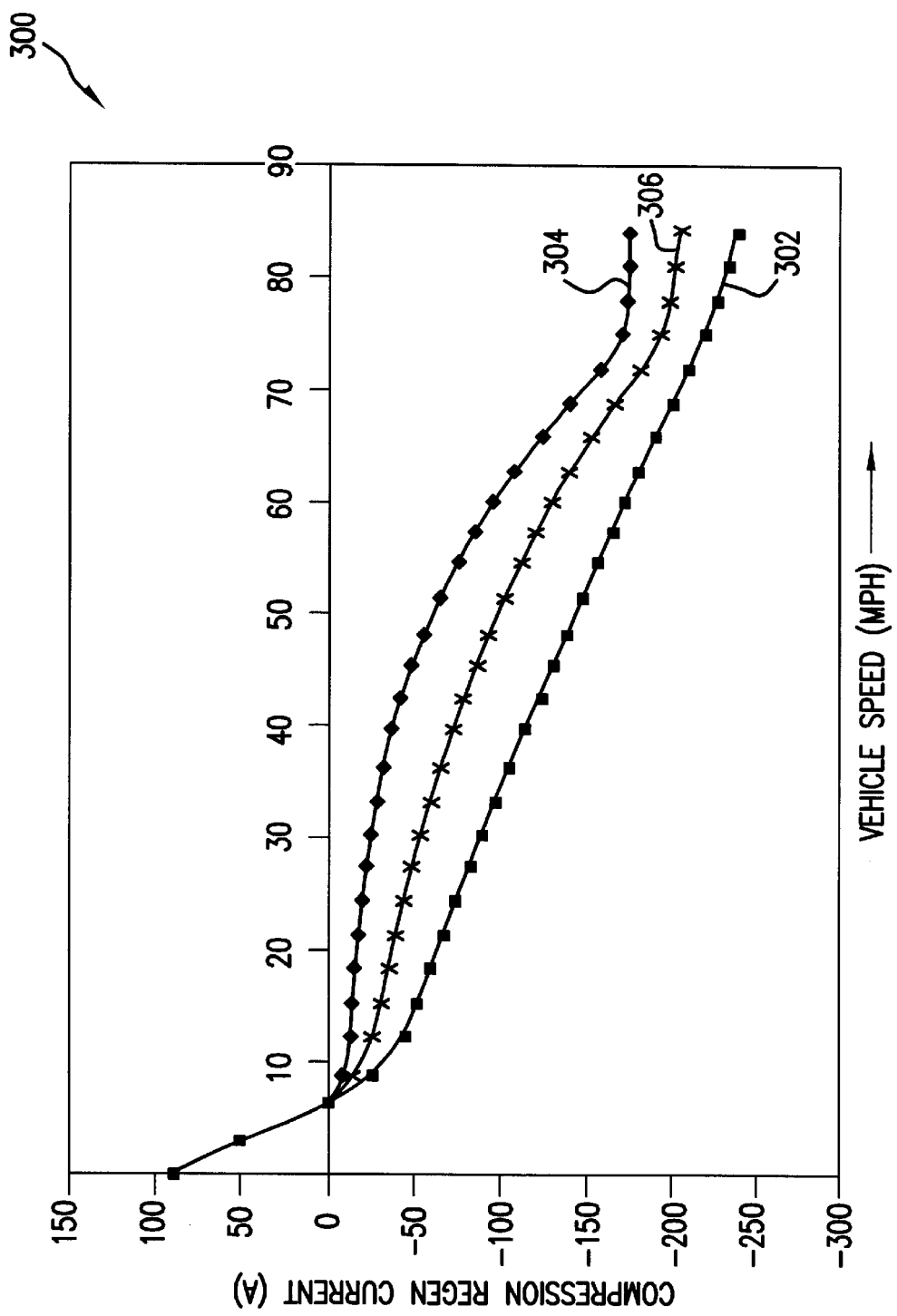
FIG. 3 is a chart illustrating exemplary maps for controlling regenerative braking force in accordance with the present invention.

FIG. 3 shows a chart 300 that includes graphs of three CBR maps in accordance with a preferred embodiment of the invention. The x-axis of chart 300 is vehicle speed in miles per hour. The y-axis of chart 300 is the compression regeneration current to the battery in amps. A negative current represents a charging current to the battery, where electric motor/transaxle 102 is acting as a generator. Conversely, a positive current reflects current flow from battery 106, where electric motor/transaxle 102 is used to propel the drive wheels 105.

In a preferred vehicle, two gears are provided to drive the vehicle forward. A first gear, referred to as the D gear, is the normal drive gear for the vehicle. The D gear operation is designed to emulate an automatic transmission gas engine vehicle in drive or overdrive. A second gear, referred to as the E gear, is an economy mode gear. In the E gear, regenerative braking is maximized to recharge the battery and therefore increase the vehicle range for a battery electric vehicle, or increase fuel economy for a hybrid electric vehicle.

Curve 304 is a plot of a CBR map for operating a preferred vehicle in the D gear. The CBR map for the D gear provides a compression regenerative braking force that avoids wheel slip at all temperatures. That is, slips due to a lift-throttle event do not occur for the CBR map for the D gear. Curve 302 is a plot of the standard CBR map for the E gear that is applied for temperatures equal to or greater than the high temperature threshold, in the preferred case, 15 degrees Celsius. Curve 302 maximizes the compression regenerative braking force, and hence, the compression regenerative current used to recharge the battery. Curve 306 is a plot of the cold weather CBR map that is used for temperatures less than the low temperature threshold, in the preferred case, 4 degrees Celsius. As illustrated by curve 306, the cold weather CBR map provides more compression regenerative braking than the D gear and less regenerative braking than the E gear at high temperature.

As discussed above with respect to FIG. 2, for ambient temperatures between the high temperature threshold and the low temperature threshold, a linear interpolation is used to determine the CBR map. In the preferred embodiment, the CBR map for temperatures between 4 degrees and 15 degrees Celsius is determined by the following equation:

$$I_{CBR}(s)=I_{E\text{-}high}(s)-K*[(I_{E\text{-}high}(s)-I_D(s))*0.55]$$

where $I_{CBR}(s)$ is the compression regenerative braking current in amps at vehicle speed s in miles per hour; $I_{E\text{-}high}(s)$ is the standard CBR map (curve 302) current at speed s; $I_D(s)$ is the CBR map (curve 304) current for the D gear at speed s; and K is a quantity determined by the following equation:

$$K=-0.909*T_{amb}+1.3636$$

where $T_{amb}$ is the ambient temperature (Celsius). K does not have dimensions or units.

According to the invention, for low ambient temperatures, the amount of compression regenerative braking force applied to the wheels of a vehicle is reduced. Advantageously, there is greater stability in the wheels of a vehicle upon the occurrence of a lift-throttle event when temperatures get cold enough to form snow and ice.

The above-described embodiments of the invention are provided purely for purposes of example. Many other variations, modifications, and applications of the invention may be made.

What is claimed is:

1. A method for controlling the amount of regenerative braking force applied to wheels of a vehicle, the method comprising the steps of:

determining an ambient temperature around a vehicle;
selecting a first compression regenerative braking function as a selected compression regenerative braking function based on the ambient temperature;
detecting a lift-throttle event; and
in response to the lift-throttle event, applying the selected compression regenerative braking function to determine a regenerative braking force to a wheel of the vehicle.

2. The method of claim 1 wherein the step of selecting the first compression regenerative braking function includes the step of selecting the first compression regenerative braking function as the selected compression regenerative braking function if the ambient temperature is equal to or greater than a first threshold.

3. The method of claim 2 further comprising the steps of:
prior to applying the selected compression regenerative braking function:
determining whether the ambient temperature is less than a second threshold;
if the ambient temperature is less than the second threshold, then selecting a second compression regenerative braking function as the selected compression regenerative braking function.

4. The method of claim 3 further comprising the step of:
prior to applying the selected compression regenerative braking function:
determining whether the ambient temperature is between the first threshold and the second threshold; and
if the ambient temperature is between the first threshold and the second threshold, then selecting a third compression regenerative braking function as the selected compression regenerative braking function.

5. The method of claim 1 wherein the selected compression regenerative braking function determines, as a function of a vehicle speed, a current to be supplied by an electric motor that controls wheels of the vehicle.

6. The method of claim 4 wherein the third compression regenerative braking function is a function of the first compression regenerative braking function and the second compression regenerative braking function.

7. The method of claim 6 wherein the third compression regenerative braking function is a linear interpolation between the first compression regenerative braking function and the second compression regenerative braking function.

8. The method of claim 3 wherein the first threshold is about 15 degrees Celsius and the second threshold is about 4 degrees Celsius.

9. The method of claim 4 further comprising the steps of:
after applying the selected compression regenerative braking function:
detecting an anti-lock brake event; and
in response to the anti-lock brake event, rapidly reducing an amount of compression regenerative braking being applied to zero.

10. A vehicle comprising:
a sensor that monitors an ambient temperature around the vehicle;
a processor coupled to the sensor to receive the ambient temperature;
wherein the processor:
selects a first compression regenerative braking function as a selected compression regenerative braking function based on the ambient temperature; and
in response to a lift-throttle event, applies the selected compression regenerative braking function to determine a regenerative braking force to a wheel of the vehicle.

11. The vehicle of claim 10 wherein the lift-throttle event is detected by an accelerator position sensor.

12. The vehicle of claim 11 wherein the processor selects the first compression regenerative braking function as the selected compression regenerative braking function if the ambient temperature is equal to or greater than a first threshold.

13. The vehicle of claim 12 wherein the processor, prior to applying the selected compression regenerative braking function:

determines whether the ambient temperature is less than a second threshold; and if the ambient temperature is less than the second threshold, then selects a second compression regenerative braking function as the selected compression regenerative braking function.

14. The vehicle of claim 13 wherein the processor, prior to applying the selected compression regenerative braking function:

determines whether the ambient temperature is between the first threshold and the second threshold; and if the ambient temperature is between the first threshold and the second threshold, then selects a third compression regenerative braking function as the selected compression regenerative braking function.

15. The vehicle of claim 14 wherein the third compression regenerative braking function is a function of the first compression regenerative braking function and the second compression regenerative braking function.

16. The method of claim 15 wherein the third compression regenerative braking function is a linear interpolation between the first compression regenerative braking function and the second compression regenerative braking function.

17. The method of claim 13 wherein the first threshold is about 15 degrees Celsius and the second threshold is about 4 degrees Celsius.

18. The method of claim 10 wherein the selected compression regenerative braking function determines a current to be supplied by an electric motor that controls wheels of the vehicle as a function of a vehicle speed.

19. An apparatus for controlling compression regenerative braking to a wheel of a vehicle, the apparatus comprising:

a processor that:

receives an indication of an ambient temperature about the vehicle;

selects a first compression regenerative braking function as a selected compression regenerative braking function based on the ambient temperature; and in response to a lift-throttle event, applies the selected compression regenerative braking function to determine a regenerative braking force to the wheel of the vehicle.

20. The apparatus of claim 19 wherein the selected compression regenerative braking function determines a current to be supplied by an electric motor that controls the wheel of the vehicle as a function of a speed of the vehicle.

* * * * *